US010933742B2

(12) United States Patent
Bittner et al.

(10) Patent No.: US 10,933,742 B2
(45) Date of Patent: Mar. 2, 2021

(54) OPERATOR INPUT FOR ALTERNATIVE TRACTION CONTROL

(71) Applicant: CNH Industrial America LLC, New Holland, PA (US)

(72) Inventors: Roy Bittner, Cato, WI (US); Nathan Brooks, Manitowoc, WI (US); Lawrence Borucki, Jr., Oostburg, WI (US); Steven Winkel, Kiel, WI (US); Blaine Schwalbe, Valders, WI (US)

(73) Assignee: CNH Industrial America LLC, New Holland, PA (US)

( * ) Notice: Subject to any disclaimer, the term of this patent is extended or adjusted under 35 U.S.C. 154(b) by 153 days.

(21) Appl. No.: 16/220,694

(22) Filed: Dec. 14, 2018

(65) Prior Publication Data

US 2020/0189388 A1 Jun. 18, 2020

(51) Int. Cl.
*B60K 23/08* (2006.01)
*B60W 10/119* (2012.01)
(Continued)

(52) U.S. Cl.
CPC ........... *B60K 23/08* (2013.01); *B60W 10/119* (2013.01); *A01B 69/008* (2013.01); *A01B 71/02* (2013.01);
(Continued)

(58) Field of Classification Search
CPC ..... B60K 23/08; B60W 10/119; B60W 10/12; B60W 2300/152; B60W 2520/26;
(Continued)

(56) References Cited

U.S. PATENT DOCUMENTS 5,102,203 A 4/1992 Tierney
5,224,044 A 6/1993 Tamura et al.
(Continued)

FOREIGN PATENT DOCUMENTS

CA 2809692 9/2014
EP 0457743 5/1990

OTHER PUBLICATIONS

John Deere; "Owners Manual for OMLVU23475_I07" http://manuals.deere.com/cceomview/omlvu23475_i0/Output/Index.html; 38 pages.

*Primary Examiner* — Michael J Zanelli
(74) *Attorney, Agent, or Firm* — Rebecca L. Henkel; Rickard K. DeMille

(57) ABSTRACT

An alternative traction control system, in addition to a primary traction control system, is associated with an agricultural machine in which a user selectable input can allow wheels of an the agricultural machine to spin freely, such as for clearing debris from tires, until a predetermined deactivate condition occurs. Such a deactivate condition could comprise, for example, reaching a maximum rotation speed and/or temperature threshold with respect to a wheel. To minimize the risk of damage to propulsion components which may be caused by excessive rotation speeds and/or temperatures, upon reaching such a threshold, operation can return from the alternative traction control system to the primary traction control system. Such a system can therefore allow an "on the fly" change that would permit an operator to selectively spin the tires without damaging mechanical aspects of the agricultural machine.

20 Claims, 3 Drawing Sheets

(51) Int. Cl.
  *A01B 69/04* (2006.01)
  *A01B 71/02* (2006.01)
  *B60W 10/12* (2012.01)
  *B60W 30/18* (2012.01)

(52) U.S. Cl.
  CPC ....... *B60W 10/12* (2013.01); *B60W 30/18172* (2013.01); *B60W 2300/152* (2013.01); *B60W 2520/26* (2013.01); *B60W 2710/125* (2013.01); *B60Y 2200/221* (2013.01)

(58) Field of Classification Search
  CPC ...... B60W 2710/125; B60W 30/18172; A01B 69/008; A01B 71/02; B60Y 2200/221
  See application file for complete search history.

(56) References Cited

U.S. PATENT DOCUMENTS

| | | | |
|---|---|---|---|
| 5,463,551 A | 10/1995 | Milunas | |
| 5,682,958 A | 11/1997 | Kalhorn et al. | |
| 5,735,362 A * | 4/1998 | Hrovat | B60K 28/16 180/197 |
| 5,802,489 A | 9/1998 | Orbach et al. | |
| 6,085,138 A | 7/2000 | Smith et al. | |
| 6,174,255 B1 * | 1/2001 | Porter | B60K 17/34 180/235 |
| 6,666,279 B2 | 12/2003 | Scarlett et al. | |
| 7,600,599 B1 * | 10/2009 | Dahl | B60K 23/08 180/249 |
| 7,853,389 B2 | 12/2010 | Luehrsen et al. | |
| 9,037,341 B2 | 5/2015 | James et al. | |
| 9,631,345 B2 | 4/2017 | Tanaka et al. | |
| 9,956,874 B2 | 5/2018 | Velde et al. | |
| 10,053,100 B2 | 8/2018 | Foster et al. | |
| 10,085,372 B2 | 10/2018 | Noyer et al. | |
| 2004/0195028 A1 * | 10/2004 | Izumi | B60K 23/04 180/249 |
| 2005/0087378 A1 | 4/2005 | Hrazdera | |
| 2008/0257569 A1 | 10/2008 | Foster et al. | |
| 2017/0008504 A1 | 1/2017 | Woopen et al. | |
| 2018/0111625 A1 | 4/2018 | James et al. | |

* cited by examiner

OPERATOR INPUT FOR ALTERNATIVE TRACTION CONTROL

FIELD OF THE INVENTION

The invention relates generally to agricultural product application equipment such as self-propelled sprayers and, in particular, to a traction control system for an agricultural machine in which a controller implements a primary traction control by selectively removing power from a wheel upon a detection of slippage of the wheel and, upon sensing an operator input, suspends the primary traction control to implement an alternative traction control by transmitting power to each wheel regardless of a detection of slippage of any wheel until a deactivate condition occurs.

BACKGROUND OF THE INVENTION

Agricultural machines such as high-clearance sprayers are getting larger and more complex. Such sprayers are typically tuned with a traction control system that is implemented by electronics which operate a propulsion system for the machine. However, in some situations, it may be desirable to allow the wheels to spin freely without such traction control, such as to allow the tires to clear debris.

Although suspending or disabling the traction control system altogether may be possible, allowing wheels to spin freely can put the system at increased risk for damage. This may be particularly the case with hydrostatic drive systems which use hydraulic motors that are operably connected to hydraulic pump(s) for rotating wheels to provide propulsion. For example, allowing wheels to spin freely can put such motors at risk of burning out when subjected to excessive rotation speeds for prolonged periods of time. A need therefore exists for an alternative traction control system which eliminates one or more of the foregoing disadvantages.

SUMMARY OF THE INVENTION

The present invention provides an alternative traction control system, in addition to a primary traction control system, in which a user selectable input can allow wheels of an agricultural machine to spin freely, such as for clearing debris from tires, until a predetermined deactivate condition occurs. Such a deactivate condition could comprise, for example, reaching a maximum rotation speed and/or temperature threshold with respect to a wheel. To minimize the risk of damage to propulsion components which may be caused by excessive rotation speeds and/or temperatures, upon reaching such a threshold, operation can return from the alternative traction control system to the primary traction control system. Such a system can therefore allow an "on the fly" change that would permit an operator to selectively spin the tires without damaging mechanical aspects of the sprayer.

In one aspect, the user selectable input could comprise selection with respect to a Graphical User Interface (GUI), a foot switch or pedal, and/or a pushbutton or switch. With a foot switch or pedal, the operator could be required to hold down the foot switch for the alternative traction control system to remain enabled. This could allow an operator to maintain hands on steering and/or application equipment without requiring adjustment for the alternative traction control.

Specifically then, one aspect of the present invention can provide a traction control system for an agricultural machine, including: multiple wheels supporting a chassis; a system for transmitting a given power to each wheel; an operator input for selecting an alternative traction control; and a controller executing a program stored in a non-transient medium to: implement a primary traction control by controlling the system to selectively remove power from a wheel upon a detection of slippage of the wheel; and upon sensing the operator input, suspend the primary traction control to implement the alternative traction control by controlling the system to transmit power to each wheel regardless of a detection of slippage of any wheel until a deactivate condition occurs, then resume the primary traction control following the deactivate condition Another aspect of the present invention can provide a traction control method for an agricultural machine, including: supporting a chassis by multiple wheels; transmitting a given power to each wheel; receiving an operator input for selecting an alternative traction control; implementing a primary traction control by selectively removing power from a wheel upon a detection of slippage of the wheel; and upon sensing the operator input, suspending the primary traction control to implement the alternative traction control by transmitting power to each wheel regardless of a detection of slippage of any wheel until a deactivate condition occurs, then resuming the primary traction control following the deactivate condition.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
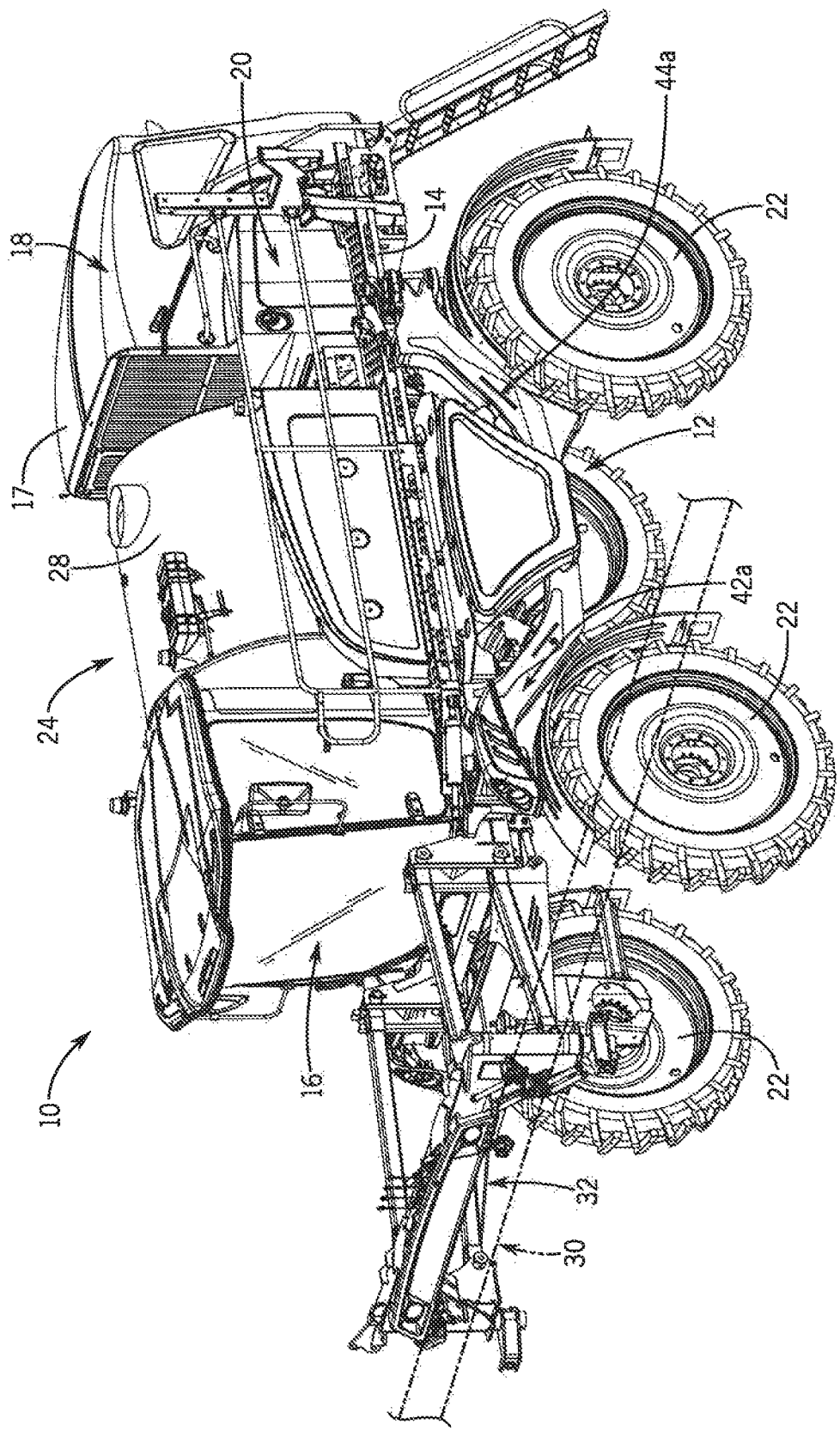
FIG. 1 is an isometric view of an agricultural machine in accordance with an aspect of the invention.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16, a spray system 24, and an engine compartment 17 housing an engine 18 and a hydraulic system 20, among other things. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. The spray system 24 can include storage containers such as a rinse tank for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of a boom 30 (shown in phantom lines) during spraying operations of sprayer 10. Groups or banks of multiple adjacent spray nozzles can define multiple spray sections of the spray system. Spray sections defined along boom 30 can selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

Also, the sprayer 10 can operate in a two-wheel steering mode or a four-wheel steering mode. In the two-wheel steering mode, the front wheels can be steered by the operator while the rear wheels are locked straight. The two-wheel steering mode can be advantageous for operating at higher speeds and/or rough terrain. However, in the four-wheel steering mode, the front and rear wheels can be steered by the operator. The four-wheel steering mode can be advantageous for operating at lower speeds and/or tighter turns.

Figure 2:
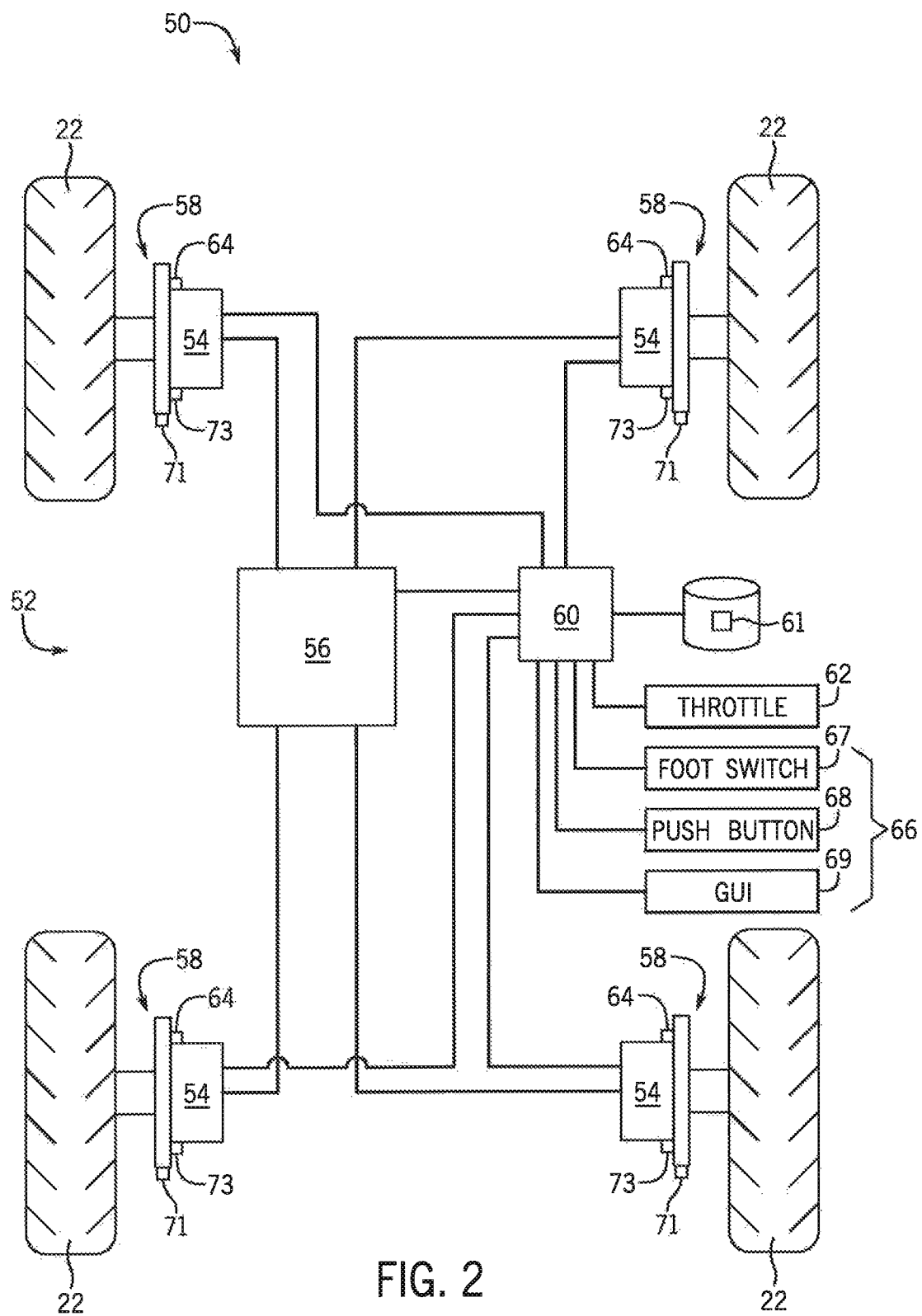
FIG. 2 is a diagram illustrating a traction control system for the agricultural machine of FIG. 1.

With additional reference to FIG. 2, a diagram illustrating a traction control system 50 for the sprayer 10 is provided in accordance with an aspect of the invention. As shown by way of example, the sprayer 10 can include a hydrostatic drive system 52 for transmitting a given power to each wheel 22. However, in an alternative arrangement, a mechanical transmission and power-transmitting driveline components could be used for transmitting the given power to each wheel 22 as discussed above with respect to FIG. 1.

In the hydrostatic arrangement, the system 52 could comprise multiple hydraulic motors 54, each operably connected to a hydraulic system 56 comprising one or more of a hydraulic fluid reservoir or tank, pump(s), valving arrangements, accumulator, and the like. Each motor 54, in turn, can be operably connected to a planetary gear arrangement 58 for rotating a wheel 22. In operation, the system 52 receives power from the engine 18, through the hydraulic system 20, and selectively delivers such power to motors 54 for rotating the respective wheels 22. An electronic controller 60 executing a program 61 stored in a non-transient medium can control distribution of such power from the system 52 to the wheels 22 for propulsion. The controller 60 can direct transmission of the power to the wheels 22 in proportion to a throttle input 62 from a user, such as an acceleration stick or pedal. In addition, the controller 60 can direct distribution of such power variably to different wheels 22 to implement a primary traction control system (or "traditional" traction control). To achieve such primary traction control, the controller 60 can control the system 52 to selectively remove power from any wheel 22 upon a detection of slippage of the wheel. Moreover, such removed power can be redirected to non-slipping wheels 22 in continuously repeating manner to maintain traction control.

To detect slippage, each wheel 22 can include a wheel speed/rotation sensor 64 for monitoring a speed of rotation of the wheel 22. The, could comprise, for example, a magnetic sensor, such as a Hall effect sensor, detecting one or more teeth rotating with the wheel 22 to determine a speed of rotation (measurable, for example, in Revolutions Per Minute (RPM)) of the wheel 22. The controller 60 can continuously receive this input from each rotation sensor 64 to then detect a slip of any wheel 22 by continuously comparing each wheel 22 to each of the other wheels 22 in the system. Moreover, the controller can also reference an angle or turn sensor 71 with respect to each wheel 22 when comparing rotation speeds of wheels 22 to determine limited slip allowance between wheels 22 on opposing sides of the sprayer 10 during turns.

In accordance with an aspect of the invention, an alternative traction control system, in addition to the primary traction control system, is further provided in which a user selectable operator input 66 in the cab 16 can allow the wheels 22 to spin freely, such as for clearing debris from tires, when activated, until a predetermined deactivate condition occurs. Upon sensing the operator input 66, the controller 60 can execute the program 61 to suspend the primary traction control to implement the alternative traction control by controlling the system 52 to instead transmit power to each wheel regardless of a detection of slippage of any wheel 22 until a deactivate condition occurs. This differs from a mere deactivation of the primary traction control system in which power may be transmitted to each wheel regardless of slippage of any wheel 22 and potentially to the point of damaging mechanical aspects of the sprayer 10. In the alternative traction control mode, the slip tolerance is changed (versus the primary traction control mode) and an average power distribution is transmitted to all the wheels 22, thereby allowing any of the wheels 22 to spin.

The deactivate condition during the alternative traction control could comprise, for example, reaching a maximum rotation speed with respect to a wheel 22, and/or reaching a maximum temperature threshold with respect to a wheel 22. To detect reaching a maximum temperature, each motor 54 can include a temperature sensor 73, such as a thermocouple, for monitoring a temperature with relative to each wheel 22, and the controller 60 can continuously receive input from each temperature sensor 73.

Following a deactivate condition, the controller 60 can then control the system 52 to cease the alternative traction control, and resume the primary traction control, to minimize the risk of damage, such as to propulsion components which may be caused by excessive rotation speeds and/or temperatures. As a result, the traction control system 50 can provide traditional traction control while allowing an "on the fly" change that would permit an operator to selectively spin the tires without damaging mechanical aspects of the sprayer.

Figure 3:
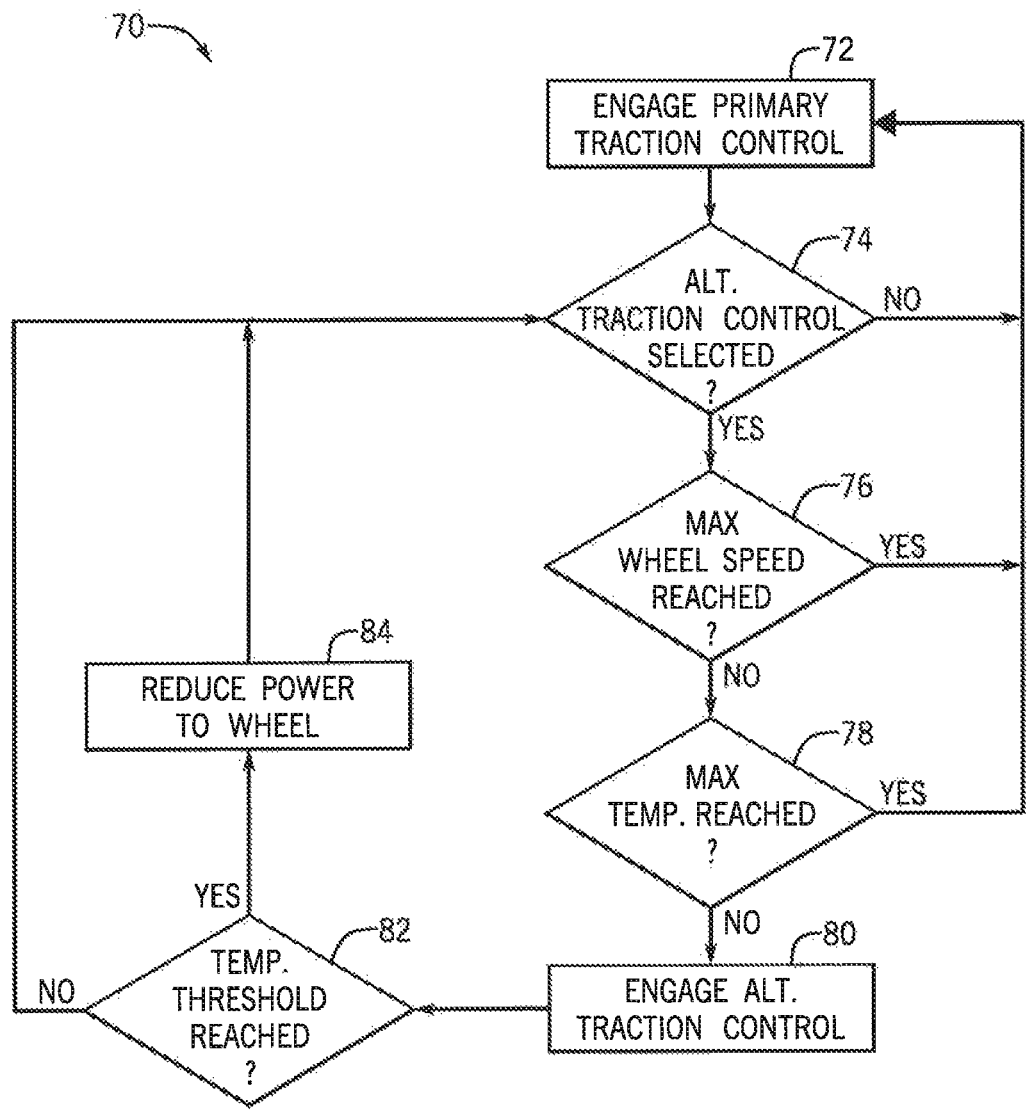
FIG. 3 is a flow chart illustrating operation of an alternative traction control with a primary traction control for the agricultural machine of FIG. 1.

With additional reference to FIG. 3, a process 70 illustrates operation of the alternative traction control with the primary traction control, under direction of the controller 60 executing the program 61, in accordance with an aspect of the invention. Beginning at step 72, the sprayer 10 can begin operation with the primary traction control, as described above with respect to FIG. 2, engaged. This can correspond to a default condition of the system. Next, at decision step 74, the controller 60 can determine whether an operator input 66 for selecting an alternative traction control is selected. In one aspect, the operator input 66 can comprises a foot switch 67 or pedal disposed in the cab 16. Holding the foot switch 67 down can cause the activation state, and not holding the foot switch down (or releasing the foot switch 67) can cause the deactivation state. In another aspect, the operator input 66 can comprise a pushbutton or switch 68 disposed in the cab 16 in which actuating the pushbutton or switch 68 a first time can cause the activation state and actuating the pushbutton or switch 68 a second time can cause the deactivation state. In another aspect, the operator input 66 can comprise a selection with respect to the GUI 69 implemented on a screen, such as a Virtual Terminal (VT), disposed in the cab 16, in which selection of an icon a first time can cause the activation state and selection (or de-selection) of the icon a second time can cause the deactivation state. If an operator input 66 for selecting an alternative traction control has not been selected ("No"), the process 70 can simply return to the primary traction control at step 72. However, if an operator input 66 for selecting an alternative traction control is selected or activated ("Yes"), the process 70 can proceed to decision step 76.

Next, at decision step 76, the controller 60 can determine whether a maximum rotation speed has been reached for any wheel 22, such as by reading the rotation sensors 64. A maximum rotation speed, for example, is preferably be less than 6000 RPM. If a maximum rotation speed for any wheel 22 has been reached ("Yes"), the process 70 can return to primary traction control at step 72. However, if a maximum rotation speed for any wheel 22 has not been reached ("No"), the process 70 can proceed to decision step 78.

Next, at decision step 78, the controller 60 can determine whether a maximum temperature has been reached for any wheel 22, such as by reading the temperature sensor 73. A maximum temperature could be, for example, 260 degrees Fahrenheit. If a maximum temperature for any wheel 22 has been reached ("Yes"), the process 70 can return to primary traction control at step 72. However, if a maximum temperature for any wheel 22 has not been reached ("No"), the process 70 can proceed to step 80.

At step 80, the controller 60 can suspend the primary traction control to implement the alternative traction control by controlling the system 52 to transmit power to each wheel 22 regardless of a detection of slippage of any wheel 22.

The process can then continue to decision step 82 in which the temperature for each wheel 22 can be monitored for reaching a predetermined threshold for power reduction during the alternative traction control. This can advantageously allow prolonging the alternative traction control. The predetermined threshold for temperature could be, for example, 240 degrees Fahrenheit. If the predetermined threshold for temperature has not been reached ("No"), the process 70 can return to decision step 74 with the same amount of power as before. However, if the predetermined threshold for temperature has been reached ("Yes"), the process 70 can proceed to step 84 in which power to one or more wheels 22 is reduced. Then, the process 70 can return to decision step 74.

Returning to decision step 74, the process 70 can determine whether the alternative traction control is still selected or activated. For example, if the foot switch 67 is no longer being held down, or the pushbutton or switch 68 has been actuated a second time to cause the deactivation state, or the icon on the GUI 69 has been selected a second time to cause the deactivation state ("No"), this can cause a deactivate condition. The process 70 can then return to primary traction control at step 72. However, if the foot switch 67 is still being held down, or the pushbutton or switch 68 has not been actuated a second time, or the icon on the GUI 69 has not been selected a second time ("Yes"), the process 70 can proceed to decision step 76 to check for another deactivate condition.

Returning to decision step 76, the controller 60 can again determine whether a maximum rotation speed has been reached for any wheel 22. If a maximum rotation speed for any wheel 22 has been reached ("Yes"), the process 70 can return to primary traction control at step 72. However, if a maximum rotation speed for any wheel 22 has not been reached ("No"), the process 70 can proceed to decision step 78 to check for another deactivate condition.

Next, at decision step 78, the controller 60 can again determine whether a maximum temperature has been reached for any wheel 22. If a maximum temperature for any wheel 22 has been reached ("Yes"), the process 70 can return to primary traction control at step 72. However, if a maximum temperature for any wheel 22 has not been reached ("No"), the process 70 can proceed to step 80. This loop can continue, with the controller 60 continuously checking for a deactivate condition while in the alternative traction control mode.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A traction control system for an agricultural machine, comprising:
a plurality of wheels supporting a chassis;
a system for transmitting a given power to each wheel;
an operator input for selecting an alternative traction control; and
a controller executing a program stored in a non-transient medium to:
implement a primary traction control by controlling the system to selectively remove power from a wheel upon a detection of slippage of the wheel; and
upon sensing the operator input, suspend the primary traction control to implement the alternative traction control by controlling the system to transmit power to each wheel regardless of a detection of slippage of any wheel until a deactivate condition occurs, then resume the primary traction control following the deactivate condition.

2. The system of claim 1, wherein the deactivate condition comprises detection of slippage of a wheel reaching a predetermined threshold.

3. The system of claim 2, wherein the predetermined threshold is less than 6000 Revolutions Per Minute (RPM).

4. The system of claim 1, wherein the deactivate condition comprises detection of a temperature relative to a wheel reaching a predetermined threshold.

5. The system of claim 1, wherein the primary traction control is suspended to implement the alternative traction control upon sensing the operator input in an activation state, and wherein the deactivate condition comprises sensing the operator input in a deactivation state.

6. The system of claim 5, wherein the operator input comprises a foot switch disposed in an operator cab supported by the chassis, and wherein holding the foot switch down causes the activation state and not holding the foot switch down causes the deactivation state.

7. The system of claim 5, wherein the operator input comprises a pushbutton or switch disposed in an operator cab supported by the chassis, and wherein actuating the pushbutton or switch a first time causes the activation state and actuating the pushbutton or switch a second time causes the deactivation state.

8. The system of claim 5, further comprising a Graphical User Interface (GUI) implemented on a screen disposed in an operator cab supported by the chassis, wherein the operator input comprises a selection with respect to the GUI.

9. The system of claim 1, wherein the system for transmitting a given power to each wheel is a hydrostatic drive system comprising a hydraulic motor operably connected to each wheel.

10. The system of claim 9, wherein the given power to each wheel is equal during the alternative traction control.

11. The system of claim 9, wherein the given power to a wheel is reduced during the alternative traction control when a temperature of a motor operably connected to the wheel reaches a predetermined threshold.

12. The system of claim 11, wherein the predetermined threshold is at least 240 degrees Fahrenheit.

13. A traction control method for an agricultural machine, the method comprising:
controlling, with an electronic controller, an operation of a system for transmitting a given power to each of a plurality of wheels of the agricultural machine to implement a primary traction control during which power is selectively removed from a wheel of the plurality of wheels upon detection of slippage of the wheel;
receiving, with the electronic controller, an operator input for selecting an alternative traction control;
upon receiving the operator input, suspending, with the electronic controller, the primary traction control to implement the alternative traction control by transmitting power to each wheel regardless of a detection of slippage of any wheel of the plurality of wheels;
determining, with the electronic controller, that a deactivate condition associated with the alternative traction control has occurred; and
upon determining that the deactivate condition has occurred, deactivating, with the electronic controller, the alternative traction control and resuming the primary traction control.

14. The method of claim 13, wherein determining that the deactivate condition has occurred comprises detecting that slippage of a wheel of the plurality of wheels has reached a predetermined threshold.

15. The method of claim 14, wherein the predetermined threshold is less than 6000 Revolutions Per Minute (RPM).

16. The method of claim 13, wherein determining that the deactivate condition has occurred comprises detecting that a temperature associated with a wheel of the plurality of wheels has reached a predetermined threshold.

17. The method of claim 13, wherein suspending the primary traction control to implement the alternative traction control comprises suspending the primary traction control to implement the alternative traction control upon sensing that the operator input is in an activation state, and wherein determining that the deactivate condition has occurred comprises sensing that the operator input is in a deactivation state.

18. The method of claim 17, wherein holding a foot switch down causes the activation state and not holding the foot switch down causes the deactivation state.

19. The method of claim 17, wherein actuating a pushbutton or switch a first time causes the activation state and actuating the pushbutton or switch a second time causes the deactivation state.

20. The method of claim 17, wherein receiving the operator input comprises receiving an operator input associated with a selection with respect to a GUI implemented on a screen disposed in an operator cab of the agricultural machine.

* * * * *